United States Patent [19]
Kerman et al.

[11] 4,081,624
[45] Mar. 28, 1978

[54] KEY TELEPHONE INTERCOM LINE SYSTEM

[75] Inventors: Stephen E. Kerman, Merrick, N.Y.; Fumio Tsutsumi, Takasaki, Japan

[73] Assignees: Nippon Tsu Shin Kogyo K.K., Kawasaki, Japan; TIE/Communications, Inc., Stamford, Conn.

[21] Appl. No.: 725,340

[22] Filed: Sep. 21, 1976

[51] Int. Cl.$^2$ ............................................. H04M 1/72
[52] U.S. Cl. ............................... 179/99; 179/18 AD; 179/18 BF
[58] Field of Search ................ 179/99, 18 AD, 1 HF, 179/81 B, 18 BF

[56] References Cited
U.S. PATENT DOCUMENTS

| 3,860,763 | 1/1975 | Sudoh et al. | 179/99 |
| 3,872,261 | 3/1975 | Shinoi et al. | 179/99 |
| 3,904,834 | 9/1975 | Shinoi et al. | 179/99 |
| 3,961,144 | 6/1976 | Hirate | 179/99 |

Primary Examiner—Kathleen H. Claffy
Assistant Examiner—Randall P. Myers
Attorney, Agent, or Firm—Kenyon & Kenyon

[57] ABSTRACT

The disclosure relates to a key telephone system intercom line circuit which uses only three leads to connect plural telephones and an intercom line control circuit. These leads comprise two talking circuit leads and one control lead. Exclusion circuits in each of the telephones are controlled by signals applied on the single control lead (1) to allow a telephone to seize the intercom line circuit when it is in an idle state, (2) to allow a called telephone (signalled via a separate pair of calling leads) to answer without being excluded and (3) to exclude all other telephones from the intercom line circuit after the calling telephone has seized the intercom line circuit. Indicators in each telephone associated with particular intercom line circuits provide a visual signal at each telephone set concerning the status of the intercom line circuit by (1) not being lit when the intercom line circuit is in an idle state (2) flashing periodically when the intercom line circuit is in the seized state and (3) being continuously lit when the intercom line is in a talking state.

10 Claims, 2 Drawing Figures

KEY TELEPHONE INTERCOM LINE SYSTEM

BACKGROUND OF THE INVENTION

2. Field of the Invention

The present invention relates to the control of intercom line circuits used in key telephone systems in which exclusion circuits are provided in each key telephone set by using one control lead and two talking leads to generate signals indicative of and for the control over (1) the state of use of intercom lines, (2) seizure of idle intercome circuits, (3) response to intercom calls, and (4) access to an intercom circuit which is already being used by two telephone sets.

2. Description of the Prior Art

In prior art key telephone apparatus, the various controls over intercom circuits is performed with two talking leads, one status control lead and one lamp control lead, totalling four leads. Also, in the intercom circuits of certain prior art telephone apparatus, methods exist for excluding a third telephone set from an intercom line to which a connection exists between a calling telephone set and a called telephone set.

In the prior art key telephone apparatus described above, it has been necessary to have four leads for each intercom circuit, and as the number of intercom circuits accommodated by a key telephone set increases, the number of leads used increases accordingly.

In the prior art key telephone intercom line circuits, when one station attempted to call another station which was already engaged in conversation, control circuits common to all intercom line circuits were held busy until the calling station abandoned the attempt. This disrupted service to other users who might attempt to call other idle stations.

An object of the present invention is to provide apparatus for controlling intercom circuits in key telephone systems by using three leads instead of the four leads per intercom circuit as used in prior art key telephone apparatus.

A further object of this invention is to provide an exclusion circuit that prevents the telephone set of a third party from overhearing the calling and the called party and which is compatible with a three lead intercom control circuit in key telephone systems.

Still further objects are to reduce the number of relays required and minimize unnecessary use of common circuits which serve the plural intercom line circuits.

SUMMARY OF THE INVENTION

These and other objects are achieved in a novel key telephone intercom line system having at least one key telephone intercom line circuit to which a plurality of key telephones are connectable, in general by intercom line key contacts. In general, more than one intercom line circuit connects to each telephone so that more than one intercom telephone call may be conducted at any one time. Each line circuit has only three leads: two talking circuit leads and one control lead.

The system is provided to allow for the simultaneous functioning of an intercom line circuit status indicator for each intercom line on each telephone set and exclusion circuits associated with each telephone set. The exclusion circuit, when operated, disconnects the telephone set transmission network from the two talking circuit leads.

A control circuit provides a first d.c. potential signal to the control lead when no telephone set is connected to the three leads of the intercom line circuit. The status of the line circuit when it is not in use is called the idle state. This first d.c. potential inhibits the indicator associated with the intercom line circuit at each telephone set.

When a telephone set is used to access the idle intercom line circuit, the first d.c. potential signal inhibits the operation of the exclusion circuit in that telephone set permitting its connection. The intercom line control circuit, sensing talking current in the talking leads, then applies a second d.c. potential signal and an interrupted or alternating signal to the control lead. This signal causes the indicator on each telephone set associated with the intercom line circuit to light in synchronism with the alternations of the signal. During this seized state, the control circuit senses dial pulses from the connected telephone set, counts the pulses and typically, selects a separate pair of calling leads on which an audio signal is applied to signal the called telephone set.

When the called telephone set is answered, its exclusion circuit is inhibited from operating in response to the second d.c. potential signal on the control lead. When answered, the called telephone set then applies a ground signal onto the control lead which is sensed by the control circuit which applies a second ground signal to the control lead. The intercom line circuit is then in a talking state.

In response to the ground signal in the control lead, the indicator on each telephone set is then continuously lit for the duration of the time that the called and calling telephone sets are connected together. If a third telephone set attempts to connect to the intercom line circuit while in the answered state, its exclusion circuit will operate to prevent its transmission network from being connected to the two talking circuit leads of the intercom line circuit.

BRIEF DESCRIPTION OF THE DRAWINGS

The invention will be better understood by referring to the attached drawings in which.

DESCRIPTION OF THE INVENTION

Figure 1:
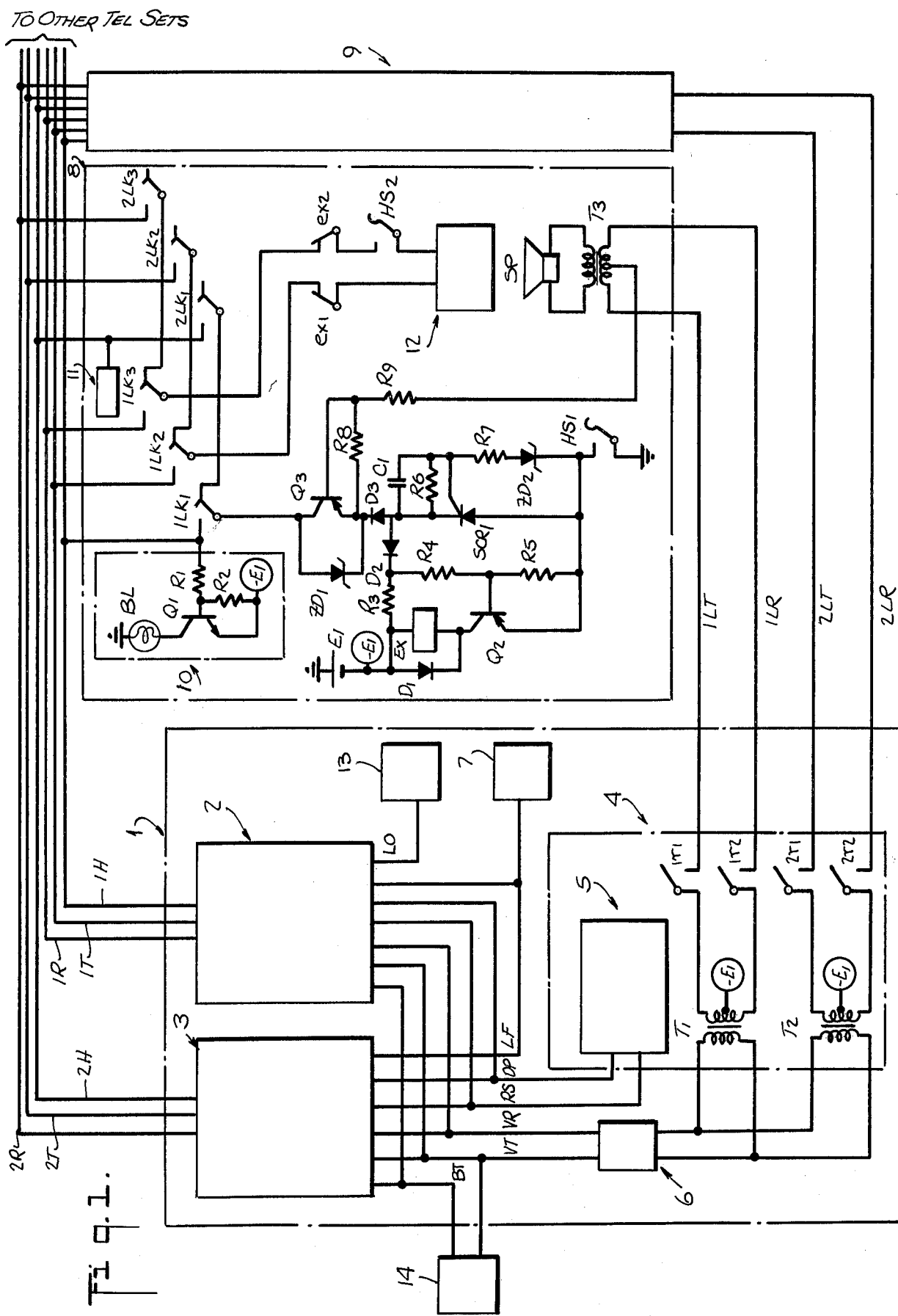
FIG. 1 shows an overall drawing of the present invention.

FIG. 1 shows a block diagram of a preferred embodiment of the present invention. The main control apparatus for the key telephone system, the key service unit 1, houses intercom line circuits 2, 3 (only two of which are shown for purposes of illustration), a dial selective circuit 4, a counter circuit 5 in the selective circuit 4, an audio amplifier 6, and an interrupter circuit 7.

Only two telephone sets 8, 9, each having identical circuitry, are shown but, of course, a plurality of sets may have access to the intercom line circuits. Indicator circuits 10 and 11 are located within the key telephone sets as are the transmission networks 12. Timing circuit 13 provides ground to the first line circuit 2. Busy signal generator 14 furnishes an audio tone which is sent to the calling station as required to indicate that the attempted call cannot be completed.

Transformers T1 and T2 couple audio signals from audio amplifier 6 to the speakers SP in the telephone sets 8, 9. Contacts 1r1, 1r2, 2r1 and 2r2 are the contacts of the counter relays of counter circuit 5. Leads 1H, 1T, 1R and 2H, 2T, 2R are control and talking leads corresponding to line circuits 2 and 3. Leads 1LT, 1LR, 2LT and 2LR are signal lines that send calling signals to telephone sets 8 and 9. Leads VT, VR and BT are signal lines from intercom line circuits 2 and 3. Lead RS is a ground signal lead for starting counter circuit 5 from intercom line circuits 2 and 3. Lead LO provides ground from timing circuit 13 to intercom line circuit 2. Lead DP is a signal lead that applies dial pulses from intercom line circuits 2 and 3 to counter circuit 5. Lead LF is a signal lead that applies periodically interrupted flashing signals from interrupter circuit 7 to intercom line circuits 2 and 3.

Contacts 1LK1, 1LK2, 1LK3, 2LK1, 2LK2 and 2LK3 are contacts of intercom line keys 1LK and 2LK (not illustrated) which respectively are used to select intercom line circuits 2 or 3. Transistor Q1 is used to control lamp BL in order to indicate the status of the intercom line circuit. Resistors R1 and R2 are bias resistors for transistor Q1. Transistor Q2 controls the operation of exclusion relay EX. Silicon Controlled Rectifier (SCR) SCR1 and Zener diodes ZD1, ZD2 are control elements in a circuit which performs the exclusion function, the operation of the circuit being explained in detail below. Resistor R3 is a holding resistor for SCR1. Resistors R4 and R5 are bias resistors for transistor Q2. Resistors R6 and R7 are gate bias resistors of SCR1. Diodes D2 and D3 control current flow through the exclusion circuit. Diode D1 is a surge absorption diode for the coil of relay EX. Capacitor C1 is used to shunt noise transient signals past SCR1. Contacts ex1 and ex2 are opened by the operation of exclusion relay EX. Contacts HS1 and HS2 are contacts of hook switch HS (not shown) and close when the telephone user lifts his handset. Transformer T3 couples call signals to speaker SP.

Figure 2:
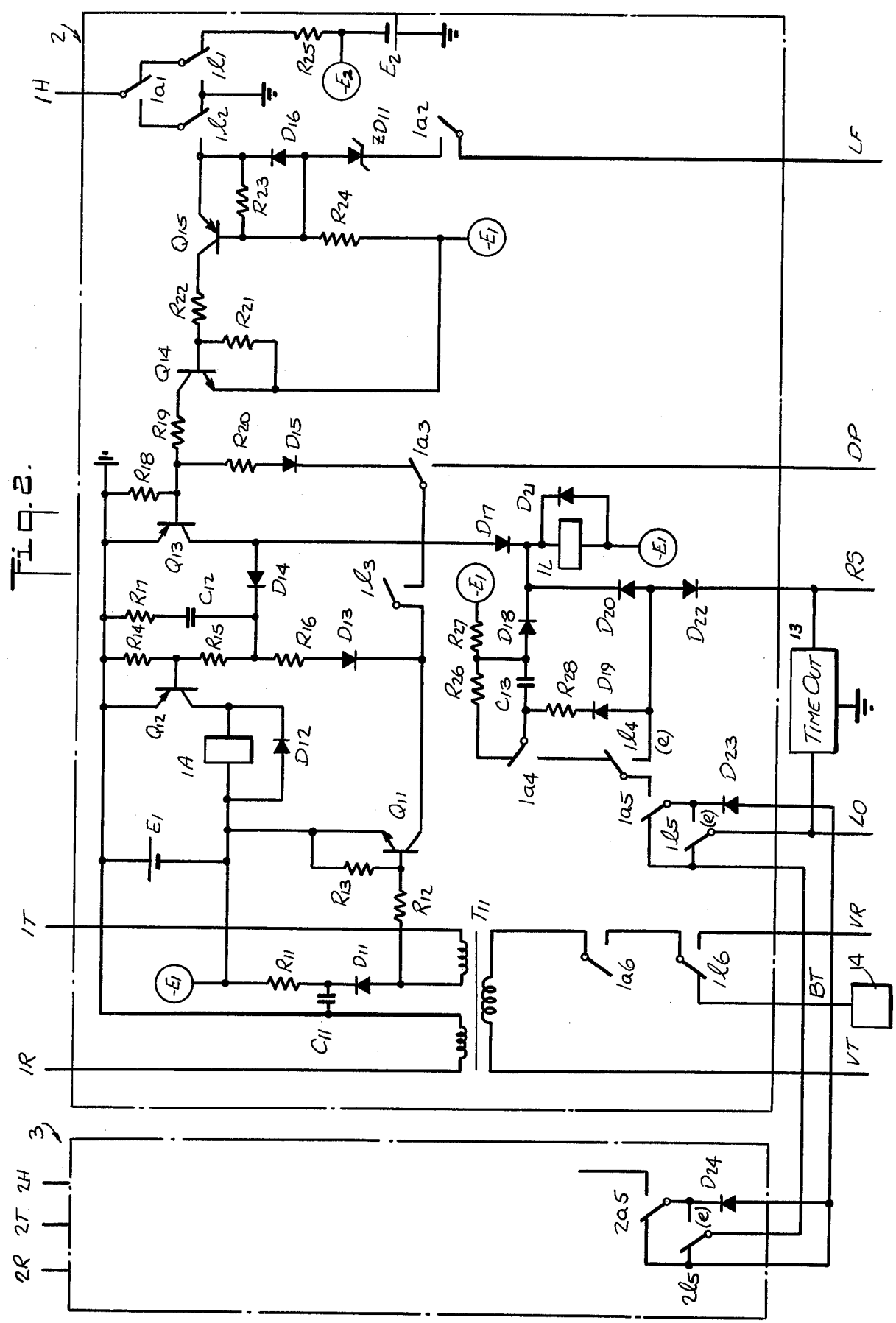
FIG. 2 is a detailed drawing of intercom line circuits 2 and 3 in FIG. 1.

FIG. 2 is a detailed schematic of the intercom line circuits 2 and 3 shown in FIG. 1. The leads 1H, 1T, 1R, 2H, 2T, 2R, VT, VR, RS, DP and LF being the same leads shown in FIG. 1. Contacts 1a1 to 1a6 and 1l1 to 1l6 are contacts respectively of relay 1A and 1L. Transistors Q11 and Q14 are NPN transistors and transistors Q12, Q13 and Q15 are PNP transistors. Diodes D11 and D24 provide current direction control in the circuit except for diodes D12 and D21 which provide surge protection respectively for relays 1A and 1L. Zener diode ZD11 provides a constant voltage across its terminals in its break-down condition.

Transformer T11 couples a.c. signals from lines 1R and 1T to VR and VT and permits the introduction of super-imposed d.c. voltage. Capacitor C11 is an a.c. bypass capacitor. Capacitor C12 is inserted to delay the turnoff of transistor Q12. Capacitor C13 is a capacitor for achieving the operation of relay 1L. Resistor R11 restricts talking current in the talking pair leads 1T and 1R.

Resistors R12 and R13 serve to bias transistor Q11. Resistors R14, R15 and R16 are bias resistors of transistor Q12. Resistor R17 is a protection resistor for transistor Q13. Resistors R18, R19 and R20 are bias resistors for transistor Q13. Resistors R21 and R22 are bias resistors for transistor Q14. Resistors R23 and R24 are bias resistors for transistor Q15. Resistor R25 serves as a current limiting resistor for circuits connected to control line 1H, thus protecting components ZD2, SCR1 and Q3 in FIG. 1. Resistor R26 is a discharge resistor for capacitor C13. Contacts 2a5, 2l5 and D24 are contacts and a diode of intercom line circuit 3 that correspond to 1a5, 1l5 and D23 of intercom line circuit 2. Also in FIG. 1 and FIG. 2, E1 and E2 are d.c. potential sources, the −E1 and −E2 symbols indicating the negative potentials of E1 and E2.

Turning now to the details of the operation of the invention, first, an explanation of the overall operation of the circuit shown in FIG. 1 will be presented. When the intercom line circuits are not in use, the potential −E2 is applies respectively from extension circuit 2 and 3 onto control lines 1H and 2H (see FIG. 2). When hook switch contact HS1 closes and key 1LK is operated in telephone set 8, the voltage across ZD1 and ZD2 exceed their Zener voltages so that gate current of SCR1 flows along the path: ground, HS1, ZD2, R7, the gate-cathode of SCR1, D3, ZD1, 1LK1 and 1H, R25 to −E2 so that the SCR1 is turned on. Once on, SCR1 is held in a conductive state by the path through diode D2 and resistor R3 to a source of d.c. potential −E1. When SCR1 is turned on, a base current does not flow in transistor Q2 because resistors R4 and R5 are shorted by diode D2 and SCR1. When transistor Q2 is not turned on, relay EX does not operate. In this state, the intercom line circuit is connected via talking lines 1T and 1R and HS2, ex1, ex2, 1LK2 and 1LK3 to the telephone transmission circuit 12 and talking current is supplied from intercom line circuit 2.

Intercom line circuit 2 removes the potential of −E2 from control line 1H in response to the talking current flowing, and an interrupted or alternating signal is applied on line 1H from interrupter circuit 7. Whe the −E2 potential is no longer applied to control line 1H, the Zener voltage of ZD1 is not reached and ZD1 does not breakdown; consequently the ground present at the cathode of SCR1 is blocked by ZD1 and Q3, so that transistor Q1 is turned on and off by the interrupted signal. Lamp BL, in response to the turning on and off of transistor Q1, flashed synchronously with the interrupted signal. Also, in this state, a starting ground is connected to counter circuit 5 via lead RS from intercom line circuit 2. By these means the connection to or seizure of an intercom line circuit (e.g., circuit 2) by telephone set 8 is accomplished.

Once an intercom line circuit is seized by the telephone set 8, when a number corresponding to telephone set 9 is dialed, dial pulses are sent to counter circuit 5 via lead DP from intercom line circuit 2, and after dial pulse counting, contacts 2r1 and 2r2 are closed if the called telephone set is not in use. Status of the called set is determined by additional circuitry beyond the scope of this patent.

If the called set is in use, or the caller does not complete dialing within a period determined by timing circuit 13, busy tone source 14 is coupled to the caller and control equipment 4 is made available for use by intercom line circuit 3.

By these means, a verbal announcement signal transmission from circuit 12 of telephone set 8 can be made which travels via speaking lines 1T and 1R, extension circuit 2, signal lines VT and VR, audio amplifier 6, transformer T2, contacts 2r1 and 2r2, signal lines 2LT and 2LR, and the transformer and speaker corresponding to T3 and SP of telephone set 8, in telephone set 9. The announcement signal is broadcast from telephone set 9 through its speaker SP.

In the calling state described, in telephone set 9, when hook switch HS and line key 1LK are operated, the corresponding telephone set 9 transistor Q3 is turned on via the route: ground, HS1, ZD2, R7, SCR1 gate-cathode, D3, Q3 emitter-base, R9, T3, 2LT, 2LR, 2r1, 2r2, T2 and −E1. In this condition, the gate current of SCR1 is still very small and SCR1 will probably not be turned on. Once Q3 starts conducting the gate current of SCR1 is limited by the resistances and voltage drops associated with D3, the Q3 emitter-collector, and line keys 1LK1 and 1H. During this time, an interrupted signal is being sent from intercom line circuit 2 to control line 1H. The Zener voltage of ZD2 and the alternating voltage levels of the interrupted signal are selected in a manner such that a sufficient gate current will flow to allow SCR1 to turn on thus SCR1 is turned on.

When SCR1 is turned on, the ground is applied through HS1, SCR1, D3, Q3 emitter-collector and 1LK1 and emerges at control lead 1H. When a ground from a telephone set (e.g., set 9) appears at control lead 1H, the intercom line circuit performs answer detection, and supplies its own ground to control lead 1H, steadily illuminating lamps BL of telephone sets 8 and 9 (and any other sets connected to the intercom line circuit).

The ground of lead RS is removed simultaneously as the lamps are lit, the counter circuit is released, contacts 2r1 and 2r2 become open, and the call circuit resets, so that the base current of Q3 stops and Q3 is turned off. However, the SCR1 of telephone set 9 remains on and current continues to flow in it by virtue of resistor R3 and diode D2 to —E1. When SCR1 is turned on relay EX does not operate and in a manner similar to the initial seizure of the intercom line circuit by telephone set 8 described above, the transmission network 12 of telephone set 9 is connected to talking lines 1T and 1R. By these means, inter-communication between the called telephone set 9 and the calling telephone set 8 is achieved.

Even if a third telephone set user attempts to use (i.e., depress line key 1LK) the same intercom line circuit being used by telephone sets 8 and 9, ground is applied to control lead 1H, and because transistor Q3 of the third telephone set will not be turned on, SCR1 will not conduct, a base current will flow via R3 and R4 to Q2, Q2 will turn on, and relay EX will operate. When relay EX operates, contacts ex1 and ex2 of the third telephone open, the network of the third telephone set will not be connected with talking lines 1T and 1R, and privacy between sets 8 and 9 is maintained. The exclusion intercom line feature explained above will operate in the same manner when intercom line circuit 3 is being used and/or telephone set 9 first calls telephone set 8, or any other telephone set.

The operation of intercom line circuits 2 and 3 will be explained in detail by referring to FIG. 2. In intercom line circuit 2, in the standby state the —E2 potential is applied through contacts 1l1 and 1a1 and appears on control lead 1H. The magnitude of —E2 is sufficient to breakdown both Zener diodes ZD1 and ZD2. Because of this —E2 voltage, the SCR1 of the calling telephone set is turned on. Relay EX does not operate as explained above. When the telephone set is connected (through ex1 and ex2) to talking lines 1T and 1R, the talking current passes through the winding of T11 and flows as the base current of Q11 so that Q11 is turned on. When Q11 turns on, base current flows via R15, R16 and D13 to transistor Q12, which is turned on, and relay 1A operates.

When relay 1A operates, a charging circuit for C13 is completed if intercom line circuit 3 has not already initiated a call attempt. Current flows via the path: ground to contact 1/5 of intercom line circuit 2, the chain circuit comprised of contacts 2/5 and 2a5 of intercom line circuit 3, D23, 1a5 (operated), 1/4, 1a4 (operated), C13, D18 and relay 1L. Relay 1L operates from this charging current. Once relay 1L operates, a self-holding circuit is completed to ground by make before-break 1/5, 1a5, make-before-break 1/4, D20, relay 1L and —E1. If intercom line circuit 3 is initiating a call, both its 2/5 and 2a5 contacts will be operated. Relay 1L will thereby be unable to operate and busy tone will be coupled to 1R and 1T via VT and BT.

When relays 1A and 1L are operated, the —E2 potential is removed from control lead 1H and the interrupted ground signal from LF is applied to 1H through operated 1a2, ZD11, D16 operated 1/2 and operated 1a1. This signal from LF appears on control lead 1H at a negative potential with rspect to ground by the Zener voltage of ZD11 and the drop of D16, but it is sufficiently positive to light the indicator lamps BL of the telephone sets. In the case of a called station, where transistor Q3 of the telephone set has turned on, it is a potential sufficiently negative to cause a gate current to flow that is capable of turning SCR1 on via ZD2.

Also, the operation of relays 1A and 1L establishes an audio path between talking lines 1T and 1R and leads VT and VR via T11, 1a6 and 1/6. Ground is supplied via 1/5, 1a5, 1/4 and D22 to lead RS. The d.c. voltage —E1 is supplied via Q11, 1/3 and 1a3 to lead DP.

By means of the operation described, intercom line circuit 2 is seized by the calling telephone set. In the state of seizure, when dial impulses are sent from the telephone set via talking lines 1T and 1R, Q11 is turned off and on synchronously with the dial impulses. By means of this repetition by Q11, the dial impulses are coupled to pulse lead DP. During the short intervals while Q11 is off during dialing, the base current of Q12 is supplied, and transistor Q12 remains turned on by the capacitor C12 discharge current.

In the condition described, when a ground potential is applied to control lead 1H from the called telephone set as a result of its SCR1 turning on when it is answered, Q15 turns on since the base of Q15 is connected to —E1 via R24, and the Zener voltage of ZD11 is established at a level that will permit sufficient current flow from control line 1H into the emitter of Q15 regardless of whether LP is at the higher or lower of its alternating voltage levels. When Q15 turns on, Q14 is turned on. When Q14 is turned on. When Q13 turns on, ground via Q13, D14 and R15 is supplied to the base of Q12, so that Q12 is turned off, capacitor C12 discharged and relay 1A releases. R17 limits the discharge current. When relay 1A releases, the original holding circuit of relay 1L is cut off by the return of 1a5 to the unoperated position shown, but 1L is held operated by means of the ground applied through Q13 and D17. A base current is supplied to transistor Q13 via R20, D15, 1a3, 1/3 and Q11, —E1 to Q13 emitter. Therefore transistor Q13 remains turned on, and C12 is held discharged via R17, Q13 and D14. Ground is applied to control lead 1H via released 1a1 and operated 1/1, and the audio path is opened by 1a6. Ground is removed from RS by 1a5 and —E1 voltage from DP by 1a3. The chain circuit is restored via 1a5 break to permit operation of relay 1L in intercom line circuit 3 should another call be initiated at this time. The intercom line circuit is in an answered or talking state.

When talking lines 1T and 1R are released from the answer state by clearing (e.g., both telephones are hung up), Q11 is turned off, Q13 is turned off, relay 1L releases, and an idle state is reached. Entirely the same operation occurs in intercom line circuit 3 as intercom line circuit 2.

As mentioned previously, ground to lead LO of intercom line circuit 2 is furnished from timing circuit 13. Using the example of a call initiated on intercom line circuit 2, when relay 1L operates subsequent to the operation of 1A, a holding path is completed from ground furnished by the timer on lead LO, through contacts 1/5 make, 1a5 make, 1/4 make and diode D20 to the coil of 1L relay. Ground is simultaneously applied via diode D22 to lead RS to activate calling circuits contained in counting circuit 5, and to start timer 13.

After 1/4 operates, capacitor C13 continues to charge via ground at the 1/4 contact, previously described, diode D19, resistor R28, capacitor C13, resistor R27, power source EL, to ground. Thus, even though relay 1L operates as a result of charging current in C13, and provides itself a holding path independent of C13, C13 continues to charge fully.

If calling telephone 8 does not finish dialing within a period determined by timer circuit 13, or dials a busy station, ground is momentarily removed from lead L0 by means within the dial selective, counter and timing circuits 4, 5 and 13, beyond the scope of the present invention.

When the ground is removed, relay 1L is no longer energized and releases. However, 1A remains operated under control of the calling station via Q11 and Q12. Contact 1/5 reconnects lead LO to contact 2/5. Contact 1/6 connects busy tone on lead BT to transformer T11, through which it is induced and heard by the caller. Contact 1/3 opens the path via contact 1/3 to lead RS, releasing the dial selective and counter circuits. Contact 1/2, places a steady ground on lead 1H to light all station indicators 10 steadily.

As mentioned, timer 13 subsequently restores ground to lead LO. This ground appears at the anodes of diodes D24 and D23, and via diode D23, contact 1a5 make, 1/4 break and 1a4 make appears at C13. However, since capacitor C13 was fully charged prior to the removal of ground, and since the only discharge path for C13 is through break contact 1a4 which is open, C13 is still fully charged when ground reappears on lead LO, and 1L cannot reoperate. Therefore, the selection and counting circuits remain idle and available for use by intercom line circuit 3, and calling telephone set 8 continues to receive busy tone.

When, finally, telephone set 8 hangs up, Q11 and Q12 transistors turn-off, releasing relay 1A. Capacitor C13 is discharged by contact 1a4 break and resistor R26, and power source E2 is reconnected to lead 1H to permit another call to be established.

Thus, by means of the charge stored in capacitor C13, the intercom line circuit eliminated unnecessary usage of the common counting and selection circuits and improves the operating efficiency of the key telephone intercom system.

What is claimed is:

1. A key telephone intercom line system comprising,
at least one key telephone intercom set of leads, each set of leads comprising two talking circuit leads and one control lead, for a total of three leads, said three leads being connectable to any of at least three key telephone sets by means of intercom line key contacts,
each of said key telephone sets having an exclusion circuit connectable through one intercom line key contact to said control lead and a transmission network connectable to the two talking circuit leads by means of two intercom line key contacts and at least one hook-switch contact, said exclusion circuit when operated disconnecting said transmission network from said two talking circuit leads,
intercom line circuit control means for applying a first signal to the control lead when no telephone set is connected to said three leads and the intercom line circuit is in an idle state,
means in each telephone set responsive to said first signal for inhibiting its exclusion circuit when said telephone is a calling telephone by being the first telephone to connect to said intercom line circuit which is in an idle state, said intercom line circuit under this condition entering a calling state,
intercom line circuit control means for applying a second signal to the control lead during the calling state,
intercom line circuit control means for generating and applying a call alerting signal over a separate telephone selection control circuit means to a called telephone set in response to calling address signals via said two talking circuit leads generated by said calling telephone,
means in said called telephone set responsive to said call alerting signal for inhibiting the exclusion circuit operation in the called telephone set when the called telephone set is answered and for applying a third signal onto said control lead, the condition when said called telephone answers being referred to as the answer state, and
intercom line circuit control means responsive to said third signal on said control lead for disconnecting said call alerting signal from said called telephone and for establishing, during the answer state, a fourth signal on said one control lead, said fourth signal causing said exclusion circuit to operate in any third telephone when its hook-switch contact and its associated intercom line key contacts are close to connect to said three leads of said line circuit.

2. The key telephone intercom line system of claim 1 wherein,
said second signal is an interrupted signal applied on said control lead when said intercom line circuit is in said calling state, said first signal is a negative first d.c. potential, and said third and fourth signals are approximately at ground potential.

3. The key telephone intercom line system of claim 2 further comprising,
indicating means associated with each set of intercom leads in each of said telephone sets responsive to said interrupted signal for providing a visual indication of said calling state, said indicating means in each of said telephone sets responding to said ground signal in said answer state by providing a continuous visual indication of said answer state, said indicating means in each of said telephones not responding to said first signal in said idle state.

4. The key telephone intercom line system of claim 3, wherein each of said telephone set exclusion circuits comprises,
an exclusion relay, the coil of which is connected between a source of d.c. potential and one side of a collector-emitter path of a first transistor, the other side of said collector-emitter path being connected to reference ground potential via a normally open-hook switch contact which is closed when the telephone handset is lifted, at least one of the contacts of said exclusion relay being in series with the telephone set transmission network, said contact being open when current flows through said coil, said contact being closed when no current flows through said coil, said transistor having a base bias network of three resistors in series, the first resistor connected to said source of d.c. potential, the third resistor connected to reference ground potential through said closed hook-switch contact the series connection point between the second series resistor and the third series resistor being connected to the base of said transistor and providing base current sufficient to turn said transistor on when current flows through said second and third resistors, a silicon controlled rectifier, the anode of which is connected to reference ground potential through said closed hook-switch contact, the cathode of which is connected to the anodes of first and second diodes, the cathode of said first diode being connected to the series connection point of said first and second resistors of said three series connected resistors, the gate of said silicon controlled rectifier being connected to the anode of a first Zener diode, the cathode of which is connected to reference ground via said closed hook-switch contact, the cathode of said second diode being connected to the cathode of a second Zener diode, the anode of said second Zener diode being connected through a closed intercom line key contact to said control lead, and under the condition that said hook-switch and said intercom line key contact are both closed and said intercom line circuit is in an idle state, said first d.c. potential on said control lead is sufficiently negative to cause said first and second Zener diodes to break down, the breakdown of said first Zener diode causing current to flow in the gate-cathode circuit of said silicon controlled rectifier thereby turning on said silicon controlled rectifier which provides a low resistance path to reference ground via said first diode, thereby preventing sufficient current from flowing in said second and third bias resistors to said first transistor, thereby preventing said first transistor from turning on, thereby preventing current from flowing in said coil of said exclusion relay and thereby preventing the opening of said contact in series with said transmission network, the current through said first diode via said first resistor, the anode-cathode path of said silicon controlled rectifier to said source of d.c. potential being sufficient to maintain the anode-cathode path of said silicon controlled rectifier in a conducting state.

5. The key telephone intercom line system of claim 4 wherein said indicating means in each of said telephone sets comprises a visual indicator connected between reference ground potential and the collector of a second transistor, the emitter of said second transistor being connected to a source of d.c. potential, the base of said transistor being connected to the series connection point between fourth and fifth resistors, the other end of said fourth resistor being connected to said source of d.c. potential, the other end of said fifth resistor being connected to said control lead, wherein during said idle state, said first d.c. potential on said control lead is sufficiently negative with respect to said source of d.c. potential as to not provide base bias current for said second transistor, thereby cutting off said second transistor and depriving said visual indicator of current, wherein during calling state, said interrupted signal alternates between first and second voltage levels, the first level being near reference ground potential thereby providing base current to said second transistor and turning on said second transistor and activating said visual indicator, the second level being sufficiently negative to turn off said second transistor and said visual indicator, said second level not being sufficiently negative to break down said second Zener diode, whereby said visual indicator flashes synchronously with said interrupted signal and said second Zener diode does not conduct during said calling state, and wherein during said answer state, said fourth signal, approximately at ground potential allows said second transistor to turn on continuously thereby continuously activating said visual signal.

6. The key telephone intercom line system of claim 4 further comprising, a third resistor in each of said key telephone sets, the collector-emitter path of which is in parallel with said second Zener diode in each of said key telephone sets, and means responsive to said call alerting signal for applying a bias voltage to the base of said third transistor for turning on said third transistor in, but only in, said called telephone during said call alerting state whereby the conducting collector-emitter path of said third transistor provides a low resistance path to said first Zener diode in said called telephone, said first and second levels of said interrupted signal being sufficiently negative to break down said first Zener diode whereby said silicon controlled rectifier in said called telephone is turned on thereby preventing current flow in said exclusion relay in said called telephone and thereby applying a near ground signal onto said control lead through said transistor when said called telephone connects to said intercom line circuit.

7. A key telephone intercom line circuit comprising at least one key telephone intercom line set of leads, each set of leads comprising two talking circuit leads and one control lead, for a total of three leads, said three leads being connectable to a plurality of key telephone sets by means of intercom line key contacts, and an intercom line control circuit comprising (a) means for applying a first signal to the control lead when no telephone set is connected to said three leads and the intercom line circuit is in an idle state, (b) means for applying an alternating second signal to the control lead, said means being responsive to current in said two talking circuit leads which flows as a result of a telephone connecting to the intercom line set of leads from an idle state, said condition being called the calling state, (c) means for generating and applying a call alerting signal over a separate telephone selection control circuit means to a called telephone set in response to calling address signals via said two talking circuit leads generated by said calling telephone during said calling state, and (d) means for disconnecting said call alerting signal from said called telephone and for establishing a fourth signal on said control lead, said means being responsive to a third signal generated by the called telephone set and applied to said control lead when said called telephone is answered in response to said call alerting signal, the condition being called the answer state.

8. The key telephone intercom line circuit of claim 7 wherein said intercom control circuit comprises a first relay which is operated in response to talking current flowing in said two talking circuit leads, said first relay, released during said idle state, being operated during said calling state, a second relay, unoperated in the idle state, which is operated in response to a second relay operate circuit being closed via a path enabled by the operation of contacts of said first relay when said first relay is operated durng said calling state, the operation of said second relay closing contacts of said second relay which establish a self-holding circuit for said second relay during said calling state, said first relay being released during said answer state in response to an answer signal applied to said control lead by an answering telephone, said second relay remaining operated during the answer state because of its self-holding circuit, said means for applying a first signal to the control lead during an idle state is a circuit connected when said first relay is released and said second relay is released, a first unoperated contact of said released second relay and a first unoperated contact of said first relay being connected to provide a path to said control lead from a source of said first signal, said means for applying a second signal to the control lead during said calling state is a circuit connected when said first relay is operated and said second relay is operated, whereby a first operated contact of said first operated relay, a second operated contact of said first operated relay and a second operated contact of said second operated relay are connected to provide a path to said control lead from a source of said second signal, said means for applying a call alerting signal over a separate telephone selection control circuit means to a called telephone set in said calling state is a telephone selection circuit connected by a third closed contact of said first operated relay and by a third closed contact of said second operated relay, said means for disconnecting said call alerting signal from said called telephone is the opening of said third contact of said first relay thereby opening said telephone selection circuit, and said means for establishing a fourth signal on said control lead during said answer state is the unoperated state of said first contact of said first released relay and the operated state of said first contact of said second operated relay thereby providing a path to said control lead from a source of said fourth signal.

9. The key telephone intercom line circuit of claim 8 wherein said intercom line control circuit further comprises means for applying a busy tone signal to said two talking circuit leads if during said calling state said called telephone has its hand set off hook or the calling telephone does not complete dialing within a preselected period of time, the condition being called the busy state, and means for releasing said separate telephone selection control circuit means for use by other key telephone intercom line circuits during said busy state.

10. The key telephone intercom line circuit of claim 9 further comprising a capacitor in said second relay operate circuit which becomes fully charged in response to current flow in it which flows to operate said second relay from an idle state at the beginning of the calling state, and wherein said means for applying a busy tone signal to two talking circuit leads and for releasing said separate telephone selection control circuit means comprises means for opening and a short time later closing said second relay operate path if a called telephone is busy or if the calling telephone does not complete dialing within a preselected period of time, the opening of said second relay operate path thereby causing said second relay to release, with the result that another contact of said released second relay provides a path from a source of busy-tone signal via another closed contact of said operated first relay to said talking leads for transmission to the calling telephone and with the result that still another contact of said released second relay is opened in said separate telephone selection control circuit, the closing a short time later of said second relay operate path being ineffective to reoperate said second relay because of the fully charged condition of said capacitor.

* * * * *

UNITED STATES PATENT AND TRADEMARK OFFICE
CERTIFICATE OF CORRECTION

PATENT NO. : 4,081,624
DATED : March 28, 1978
INVENTOR(S) : Stephen E. Kerman et al It is certified that error appears in the above-identified patent and that said Letters Patent are hereby corrected as shown below:

In the Specification:

Col. 1, line 5, change "2" to --1--.

Col. 3, line 41, change "and" second occurrence to --to--.

Col. 4, line 7, change "applies" to--applied--

Col. 4, line 7, change "circuit" to --circuits--.

Col. 4, line 35, change "flashed" to --flashes--.

Col. 5, line 52, change "111" to --1 1--.

Col. 6, line 14, change "1a1" to --1a1--.

UNITED STATES PATENT AND TRADEMARK OFFICE
CERTIFICATE OF CORRECTION

PATENT NO. : 4,081,624

DATED : March 28, 1978

INVENTOR(S) : Stephen E. Kerman et al

It is certified that error appears in the above-identified patent and that said Letters Patent are hereby corrected as shown below:

Col. 6, line 15, correct spelling of "respect".

Col. 6, line 44, change "LP" to --LF--.

Col. 6, line 46, change "When Q14 is turned on." to --When Q14 turns on, Q13 is turned on.--.

Col. 7, line 16, change "EL" to --E1--.

In the Claims:

Claim 5, Col. 10, line 7, after "during" insert --said--.

Claim 6, Col. 10, line 26, change "resistor" to --transistor--.

Claim 6, Col. 10, line 44, after first "said" insert -- third --.

Claim 8, Col. 11, line 21, "durng" should read -- during --.

Signed and Sealed this

Twenty-second Day of August 1978

[SEAL]

Attest:

RUTH C. MASON
Attesting Officer

DONALD W. BANNER
Commissioner of Patents and Trademarks